(12) United States Patent
Ewing

(10) Patent No.: US 6,258,412 B1
(45) Date of Patent: Jul. 10, 2001

(54) METHOD OF MAKING AN ARTISTIC MEDIUM

(76) Inventor: Charles Ewing, 7779 County Rd. 17, Antonito, CO (US) 81120

( * ) Notice: Subject to any disclaimer, the term of this patent is extended or adjusted under 35 U.S.C. 154(b) by 0 days.

(21) Appl. No.: 08/867,993

(22) Filed: Jun. 3, 1997

Related U.S. Application Data (60) Division of application No. 08/280,109, filed on Jul. 25, 1994, now abandoned, which is a continuation-in-part of application No. 08/075,173, filed on Jun. 9, 1993, now abandoned.

(51) Int. Cl.$^7$ .................................................. A23F 3/00
(52) U.S. Cl. ...................... 427/387; 427/391; 427/393; 427/393.5; 427/411; 427/412.1; 427/419.6; 427/420; 430/322
(58) Field of Search ................... 427/391, 393.5, 427/411, 412.1, 419.6, 393, 387, 420; 430/322

(56) References Cited

U.S. PATENT DOCUMENTS

| | | | |
|---|---|---|---|
| Re. 28,682 | * 1/1976 | Hoey | 428/196 |
| 3,616,005 | * 10/1971 | Wetstone | 156/183 |
| 3,838,085 | * 9/1974 | Myers et al. | 524/447 |
| 3,853,579 | * 12/1974 | Heiser | 117/15 |
| 3,853,797 | * 12/1974 | Pelzig | 260/17.4 ST |
| 3,951,899 | * 4/1976 | Seiner | 260/29.6 MH |
| 4,065,596 | * 12/1977 | Groody | 428/215 |
| 4,154,899 | * 5/1979 | Hershey et al. | 428/537 |
| 4,248,939 | * 2/1981 | Parsons | 428/508 |
| 4,265,969 | * 5/1981 | Yasuda et al. | 428/342 |
| 4,301,210 | * 11/1981 | Yasuda et al. | 428/342 |
| 4,323,400 | * 4/1982 | Henning | 428/36 |
| 4,374,884 | * 2/1983 | Kwok et al. | 428/95 |
| 4,562,107 | * 12/1985 | Daniels | 428/196 |
| 4,792,487 | * 12/1988 | Schubring et al. | 428/342 |
| 4,830,690 | * 5/1989 | Cooper | 156/63 |
| 4,859,723 | * 8/1989 | Kyminas et al. | 524/31 |
| 4,956,404 | * 9/1990 | Pelzig | 524/48 |
| 5,302,404 | * 4/1994 | Rissanen et al. | 428/195 |
| 5,654,039 | * 8/1997 | Wenzek et al. | 427/391 |

* cited by examiner

Primary Examiner—Judy M. Reddick
(74) Attorney, Agent, or Firm—Head, Johnson and Kachigian

(57) ABSTRACT

The present invention is directed to a mineral-based coating composition that can be used on a wide range of substrate surfaces. The composition is comprised of a mineral extender, such as a delaminated hydrated aluminum silicate based clays, having an aspect ratio of about 11 to 1, water, a homopolymer polyvinyl acetate emulsion, a co-polymer polyvinyl acetate emulsion, an acrylic emulsion binder containing a metal dioxide and a buffering agent, a surfactant and a defloculant. Also provided is a method of preparing the mineral-based coating composition. The mineral-based coating composition may be applied to various substrate surfaces to form artistic medium surfaces. The present invention also provides a method of making an artistic medium surface using the composition of the present invention.

22 Claims, 4 Drawing Sheets

METHOD OF MAKING AN ARTISTIC MEDIUM

This application is a divisional of application Ser. No. 08/280,109, filed Jul. 25, 1994 now abandoned which is a continuation-in-part of U.S. application Ser. No. 08/075,173, filed on Jun. 9, 1993, now abandoned which is incorporated herein by reference.

TECHNICAL FIELD OF THE INVENTION

This present invention is directed in general to a composition and methods of manufacture of artistic media and, more particularly, to a composition and methods of manufacture for clay-surfaced substrates.

BACKGROUND OF THE INVENTION

The use of clay as a medium for drawing or painting is not new. Countless millennia before mankind developed the ability to communicate in written or spoken language, drawings, in the form of petroglyphs, were used to express ideas and concepts. Unfortunately, these drawings required large quantities of rock face or clay and were not portable. Also, erasure was a major problem.

To answer these deficiencies, canvas came into use several hundred years ago, allowing the artist to paint pictures on lightweight, portable media. However, changing or erasing the painting once dry was difficult to nearly impossible, the canvas aged and rotted and had few of the stabilizing and texturing qualities attributable to clay.

In an effort to marry the desirable surface qualities of clay or other rock with the light weight and portability of canvas, the prior art has provided an artistic medium termed "scratchboard" or "scraper board." U.S. Pat. No. 2,523,650, which issued on Sep. 26, 1950, to Dickson, is representative of such prior art and is directed to scraper and process boards capable of being engraved or carved. Dickson teaches deposition of a relatively thick layer of china clay and a bonding agent (water-soluble hide glue) over a comparatively rigid backing, such as paste-board, ply-board or sheet metal. Deposition is by spraying.

Unfortunately, the scraper board disclosed in Dickson suffers significant shortcomings. First, the scraper board lacks the desired degree of permanence in several respects. First, the surface is non-permanent in the respect that the binder provided is optimized to bind the clay to the board and not the clay to itself. Therefore, the clay can erode as it is worked. Second, since the thin clay layer is relatively inflexible, it tends to crack easily when the relatively flexible cardboard is bent. This, too, is related to the strength of the binder.

Third, artists not working just for reproduction purposes often wish to fix a completed work on an inflexible substrate for more permanent display or storage, a necessity with fine art. Unfortunately, the cardboard backing of Dickson is not amenable to such mounting. If water-base glues are used to bind the cardboard to the inflexible substrate, the glue is liable to soak through to the clay layer, dissolving the gelatin glue and creating visible imperfections. If rubber cement is used instead, its hold may be released over time causing the formation of large bubbles in the scraperboard, thus ruining its mounting.

Fourth, since the binder of Dickson is water-soluble, it looses its integrity when wet, causing the dry clay surface to loose its binding strength and soften when wet, causing the clay surface to disintegrate when subjected to water. As such, the clay surface is limited for some watermedia techniques and photographic printing which requires total immersion of the media in water.

Fifth, the manufacturing process taught in Dickson (spraying of the clay onto the cardboard) limits the maximum size of the scraper board to about 20×30 inches, thereby limiting the opportunity of an artist to create larger scale work using the "scratchboard" technique.

Sixth, manipulation and reworking of the drawing or painting are limited due to the comparatively thin layer of clay on the soft cardboard base.

Seventh, cardboard-backed scratchboards have a tendency to crack when bent in a curve of at most 12 inches in diameter in a dry environment, e.g., approximately 10% relative humidity. This is an absolute requirement drum-type laser printers, representing the state of the art for illustration reproduction.

Eighth, the surface of the Dickson board is pitted due to small bubbles formed in the spraying application of the wet clay. These pits become obvious defects in the drawing and painting processes and contribute to the structural unsoundness of the surface.

Ninth, the manufacturing process does not lend itself to cost-effective mass production. Several spray coats of clay must be applied to each board to achieve suitable clay thickness. This results in significant manufacturing time and labor requirements.

The clay surface of Dickson allows minimal artistic manipulation. When drawing, the surface indents too easily when a sharp pencil is used, making it difficult to manipulate the line with subsequent scratching or abrading techniques. If bubbles are within the clay coating, manipulation can expose those bubbles, thus creating more surface pits.

Finally, spraying of the unrefined clay coating of Dickson onto the cardboard backing typically produces a fine mist of clay dust, containing silicates and quartz particles. Prolonged exposure to clay dust created during manufacture or artistic use can cause silicosis due to the presence of quartz crystal impurities in the unrefined clay.

Another scratchboard is disclosed in U.S. Pat. No. 1,923,483, which issued on Dec. 7, 1927, to Glenn. Glenn teaches use of a backing sheet in the form of a dense, pressed paper board (sold under the brand names "Vehisote" or "Masonite") upon which is deposited a shellac and a layer of mineral earth (principally magnesium silicate) in the form of purified talcum powder mixed with water into a paste. Deposition is performed by heaping a mass of the paste onto the backing sheet and jogging the backing sheet until the paste covers substantially all of the sheet.

Although Glenn provides a shellac and a hard backing to overcome some of the above-noted problems, Glenn fails to provide for the flexibility required for the board to run through a laser printer. Additionally, the jogging deposition method of Glenn is slow and tedious and can still cause bubbles to become entrained in the coating. Finally, Glenn fails to provide a water-resistant binder to securely fix the paste to the shellac when the dry coating is subjected to application of water.

Finally, the prior art provided a scratchboard that consists of a clay surface composed of "6 tile Georgia kaolin" clay bound together and to a ⅛ inch hardboard backing (again, Masonite) with a dilute adhesive. The permanence and physical durability was greatly increased by the clay being applied to a rigid flat base (a hardboard), a factor which also solved the mounting as described above. The board was frame-ready, and needs no glass for protection when sealed with an acrylic or varnish sealer. Provision of the rigid base and the dilute adhesive binder allowed the surface size to be extended up to 4 feet by 8 feet. This prior art scratchboard also provided a thicker clay layer, allowing more vigorous manipulation and reworking. Use of the dilute adhesive binder in the clay mix also gave much better water resistance, thus allowing the use of waterbased painting on the scratchboard.

The 6 tile kaolin scratchboard thus solved most of the above-noted problems with the earlier forms of scratchboard, but created in their place some new ones. First, the manufacturing process, never developed for mass production, was similar to that taught in Dickson, i.e., multiple spray coatings. This process was time and labor intensive, and, more important, produces small bubbles (on the order of 0.004–0.015 inches in diameter) that dry in the clay layer, becoming unwanted surface pits in the drawing, painting, and photographic print surface or, more insidiously, latent defects within the clay coating itself, becoming exposed only as the artist works. Manufacturing of 6 kaolin scratchboard required extensive refinishing to minimize the number of bubbles, resulting in considerable loss on material to the air and creating a risk of silicosis to workers exposed to atomized clay mist containing quartz particles.

The spraying process employed in producing the prior art 6 tile kaolin scratchboard, coupled with the need to layer the applications, made production cumbersome and expensive, and more important, rendered the surface quality inadequate. The 6 tile kaolin scratchboard did not employ a chemical to reduce surface tension. In many production runs of the 6 kaolin scratchboard, scrap rates of 50% or more have been measured.

A second problem with the prior art scratchboard is that 6 tile kaolin has a considerable amount of impurities, including iron compounds, that gave it a slightly brown color, undesirable for most art work and photo printing because of the imposed color and/or value on the image produced. This is particularly important for illustration purposes where reproduction requires the whitest possible surface.

A third problem is that 6 kaolin, like the English-mined China clay of Dickson also contains a significant amount of quartz particles, presenting the health hazard of potential silicosis for those who are subjected to prolonged exposure to the clay dust. Even artists whose principal medium of expression includes unpurified kaolin-coated art boards prudently used respirators when scratching and abrading the surface, still creating significant amounts of clay dust.

A fourth problem is that the existence of impurities and the lack of a uniform particle size in 6 and English mined kaolin clays required more liquid mixed in to arrive at a given viscosity, even with the use of a defloculant such as sodium silicate. More liquid in the applied mix required a longer drying time and resulted in more shrinkage of the clay layer during the drying process, giving rise to higher incidence of cracking.

A fifth problem is that the unrefined kaolin clays required more binding adhesive to coat the conglomeration of particle sizes and impurities for a given bonding integrity within the clay layer and between the clay layer and sealer coat.

The 6 kaolin scratchboard was sealed using waterproof adhesive before the clay layer was applied. This sealer, while attempting to prevent ion exchange from the hardboard to the clay layer and while giving a good bonding interface between the hardboard and the clay still remained somewhat porous and wettable. This caused three problems: (1) the ion blockage was of questionable effectiveness over long periods of time raising doubts as to whether the pH of the clay surface would remain unaffected, a point of considerable concern regarding pigment stability of the artwork on the surface, (2) the porosity of the sealer caused, upon rewetting, a "show-through" of the dark hardboard surface, a change in color and value that even shows up through the finished clay layer when it is rewetted in the normal use of different water media, and (3) the porosity of the sealer created an "orange peel" surface texture in the dry clay coating requiring extensive sanding to achieve a smooth surface.

The artist was required to continually take this into account when working, remaining aware that the color of the brush stroke laid down appears darker because of show-through than it will be after the clay surface dries and returns to its original color and value. This becomes particularly problematic in the photo printing process where control of delicate values while developing a print is crucial to the success of the photo in reproducing colors and shades with high fidelity.

Fifth, the resulting relatively brittle and non-uniform nature of the clay layer limited the 6 kaolin scratchboard's use to flat, rigid bases which cannot be used in drum-type laser printers. These laser printers are in wide use among printers who reproduce illustrations. Also, the hard, brittle, non-uniform nature of the clay surface was a problem when scratching or scraping with a pigment removal tool, making each stroke choppy instead of smooth and controlled, an essential element for an artist.

Other proposed artistic clay formulations that use either water-soluble binder hide glue or a polyvinyl acetate emulsion (PVA) as the sole binding agent also have several disadvantages. First, these formulations do not have the desired degree of permanence, which is defined herein as the coating quality allowing it to maintain its integrity for 25 years or more under the normal treatment of art works. The permanence of an artistic medium can be affected in many ways.

For instance, the quality of adhesion may affect the permanence of the artistic medium. Adhesion is defined herein as the bond between the coating and the substrate, whether in a wet or dry state. Artistic adhesive formulations that use water-soluble binder hide glue or polyvinyl acetate emulsion as the sole binding agent have adequate dry adhesion to porous substrates such as cardboard or unsealed hardboard but are limited to those substrates since neither has good adhesion when the coating is wetted in artistic applications of water media, or when applied to slick non-porous substrates such as primed/sealed hardboard, metal, plastic or glass. Application of these adhesives are thus limited to coatings only to unsealed, porous substrates of organic fiber in order to achieve a mechanical bond as the wet coating soaks in to the porous substrate.

Another factor that can affect permanence is in regard to particle bonding that, which is defined herein as the bond between the mineral particles in the coating. Again, due to the use of hide glue or PVA as the sole binding agent, the clay surfaces can exhibit a deficiency in resilience and flexibility, which, when struck or pressed on by a hard object or subjected to bending stress may easily suffer indentations or cracking of the surface, respectively.

Yet another factor that can affect permanence is in regard to chemical stability, which is defined herein as the coating's non-reactivity with other chemicals such as acids, bases, color pigments, pigment vehicles, varnishes, etc. In many conventional applications, the coating is not chemically isolated from the substrate of acidic wood fiber in the cardboard and hardboard substrates, which overtime allows the passage of acidic ions from the substrate to the coating. Moreover, the prior art adhesive formulations, which typically have a pH of approximately 4.0–5.0, are acidic in nature and therefore chemically active. Due to the deficiencies of the adhesives typically used as discussed above, it is not feasible to apply these coatings to slick, sealed, non-porous substrates. Therefore, the acidic ions are left uninhibited to migrate into the pigment and compromise the integrity of some color pigments and pigment vehicles causing a change in color over time, and in turn, compromising the integrity of art work on the surface.

Still another factor that can affect permanence is in regard to resistance to ultra-violet (UV) light degradation, which is defined herein as the coating's ability to maintain its integrity color and bond strength under prolonged exposure to UV light rays. The conventional formulations using hide glue as the adhesive may experience undesirable levels of degradation since the adhesive is of organic origin, and thus subject to UV light degradation. Moreover, in applications involving unrefined kaolin, which is a clay having a light brown color due to organic impurities, the unrefined kaolin gradually bleaches to a lighter color as the UV light reacts on the organic impurities, thus compromising the original values and color as rendered by the artist. Furthermore, this same use of an unrefined kaolin, which has a wide range of clay particle sizes, requires more binder for a given bond strength.

The second disadvantage of conventional artistic formulations regards the durability in use, which is defined herein as the ability of the coating to maintain its original qualities under normal conditions of artistic use, including coating flexibility, coating resilience, rewetability, and particle bonding. Durability in use may further be defined by ASTM standard D-3290 as "the ability to resist the effect of wear and tear in performance situations."

As was the case with permanence characteristics, there are several factors that may also affect durability of use, for example, coating flexibility, which is defined herein as the ability of the coating to resist cracking or flaking when bent either in compression or tension. In proposed artistic mediums using hide glue or PVA in conjunction with unrefined clays, the coating produced is a relatively brittle coating which experiences cracking when bent to a diameter of approximately 12 inches or less under dry environmental conditions of 10% humidity or less. As used herein, an unrefined clay is one which is processed by a dry air alutriation process, has particles ranging in size from 0.2 microns up to 44 microns and contains impurities such as free crystalline silica. In physical abuse situations, not uncommon in the normal handling of an art surface, accidental bending of the substrate would thus result in its degradation due to surface cracking. This limitation in flexibility would also prevent the coating's effective use in the art reproduction machine known as a laser printer in which the art work must be fed through the machine on a roller of 10" diameter.

Another factor that affects durability in use is in regard to coating resilience or hardness, which is defined herein as a coating's ability, whether wet or dry, to resist indentation from the force of a hard, sharp object such as a pencil lead or ink pen on the surface. The prior art medium having a soft, non-resilient surface is relatively easy to indent with normal pencil pressure on the surface and extremely easy to do so on a wet surface. Thus, on a surface intended to be drawn upon and erased multiple times, the indented line would remain visible, thus limiting these surfaces in the amount of robust reworking the artist could achieve.

Another factor affecting durability in use is in regard to the particle bond quality, which is defined herein as bond strength between clay particles under both wet and dry conditions. The prior art which uses hide glue, a water soluble binder, does not maintain an acceptable particle bond when wetted, thereby preventing effective artistic manipulation of pigment when the surface is wet as commonly occurs with water media applications. Further, immersion in water for a long period of time totally disintegrates this coating because of the water solubility of the glue. Proposed artistic media formulations which use PVA, a water miscible binder, provides a bond stronger than that of hide glue but one, which, when wet can still be broken down by physical manipulation of the surface such as a brush stroke on the wet surface. This undesirable physical characteristic causes clay particles to disengage from the surface and mix with the color pigment of the brush stroke changing its color intensity. Further, this deficiency prevents the use of these media as a surface onto which a photo emulsion may be placed to print a photo due to the requisite developing, fixing, and washing baths of normal photo developing.

Yet another factor affecting durability is in regard to toolability, which is defined herein as the quality of the coating which allows consistent, smooth working of the surface with scratching, scraping, or abrading tools. The prior art media which uses hide glue as a binder provides a relatively soft, non-resilient coating surface which must be scratched or scraped in a delicately conservative manner so as not to cut too deeply thereby ruining the surface. These prior art media typically use unrefined kaolin that provides a relatively brittle surface, as noted before. In addition however, due to the clumping of particles in an unrefined clay, the coating exhibits hardness (i.e., density) inconsistencies in the surface. This, in turn, causes inconsistent tooling results, an important factor to the artist who needs as much tool control as possible to consistently render accurate pigment removal strokes, as well as an important factor in manufacturing quality control regarding surface dressing procedures. This deficiency also causes inconsistencies in the way the surface absorbs liquid-borne pigments causing 'spotting' upon applying certain paints to the surface.

A third disadvantage regards art rendering problems, which is defined herein as qualities of the coating surface which create difficulties in rendering artwork on the surface as well as shortcomings in the final presentation of the finished work. Again, several factors affect art rendering characteristics, for instance, surface pitting. Many prior art applications use a spraying technique to apply the coating mix to the substrate which entraps many small bubbles in the coating layer. When allowed to air dry, these wet bubbles become air pockets throughout the coating layer with some bubbles being visible on the surface and some being embedded in the layer. In the normal application and removal of color pigment, the deep pits become filled with pigment making it impractical to totally scrape them clean for an unblemished highlight area if desired by the artist. Further, the pitting creates problems in consistent tool use, for example, by catching the point of an ink pen as a line is being executed, or by making a scraping stroke rough and uneven.

Another factor affecting art rendering is in regard to value change upon wetting, defined herein as the darkening of the clay surface when water is applied due to show-through of the dark substrate. In artistic medium using conventional adhesion formulations, a sealer of light color to block this wet show-through cannot be used, thereby making it difficult for the artist to discern what the true value and color of a brush stroke will be when it later dries.

Still another factor affecting art rendering is in regard to coating color, which is defined herein as the color imparted to the surface by the clay itself. Typical clay-based artistic mediums use unrefined clays which give a light brownish cast (e.g., 6 tile kaolin clay) or a cold blue-white color (e.g. the Dickson clay) due to the presence of iron and organic impurities, which is normally considered undesirable for illustration renderings since the whitest possible surface is required for effective reproduction.

A fourth disadvantage is the health hazard created by the use of the conventional clay-based artistic mediums. As previously stated, typical clay-based artistic mediums use unrefined kaolin clays that contain significant amounts of quartz crystals. As the artist works the medium, these quartz crystals may be inhaled along with the clay dust created by the abrasion or scratching techniques or by the air-borne spraying application techniques common to the art. Over a period of time, these harmful particles can accumulate in the lungs, thus posing a risk of developing the respiratory diseases.

Thus, what is needed in the art is a coating and method of manufacturing the same that overcomes all of the above-noted disadvantages of the prior art.

SUMMARY OF THE INVENTION

To address the deficiencies of the prior art, it is a primary object of the present invention to provide a mineral-based coating composition comprising a mineral extender, water, polyvinyl acetate emulsion and an acrylic polymer binder. In a preferred embodiment, the mineral extender comprises from about 20% to about 36% of the composition's total weight, and in a more preferred embodiment, the mineral extender comprises from about 30% to about 32% of the composition's total weight and is preferably a delaminated clay. The water preferably comprises from about 40% to about 50% and more preferably comprises from about 44% to about 46% of the composition's total weight. The polyvinyl acetate emulsion preferably comprises from about 16% to about 24%, and more preferably comprises from about 19% to about 20% of the composition's total weight. The acrylic polymer binder preferably comprises from about 2% to about 5%, and more preferably from about 3% to about 4% of the composition's total weight.

Preferably, the mineral extender is selected from the group consisting of kaolin clay, mica, talc, montmorillonite, atapulgite, illite, bentonite or halloysite, and more preferably is a hydrated aluminum-silicate kaolin clay having an aspect ratio of about 11 to 1.

In a preferred embodiment of the present invention, the polyvinyl acetate emulsion is comprised of a homopolymer polyvinyl acetate emulsion and co-polymer polyvinyl acetate emulsion with the homopolymer polyvinyl acetate emulsion preferably comprising from about 13% to about 18%, and more preferably from about 14% to about 15% of the composition's total weight and the co-polymer polyvinyl acetate emulsion preferably comprising from about 3% to about 6%, and more preferably from about 4% to about 5% of the composition's total weight.

In another aspect of the preferred embodiment of the present invention the acrylic polymer binder further comprises a pigment and a buffering agent wherein the pigment is preferably a Group II metal dioxide, preferably selected form the group consisting of titanium dioxide, zirconium dioxide and hafnium dioxide and more preferably is titanium dioxide with the buffering agent being calcium carbonate.

In yet another aspect of the preferred embodiment of the present invention, the mineral-based surface coating composition further comprises a nonfoaming surfactant and a defloculant wherein the defloculant is a sodium silicate.

In another aspect of the present invention, a method for making the composition of the present invention is also provided. The steps of making the invention comprise, (a). preparing a binder mixture by mixing approximately 3 parts per unit volume the homopolymer polyvinyl acetate with approximately 1 part per unit volume of the co-polymer polyvinyl acetate in a mixing container; (b). preparing a binder/water mixture by adding, for each approximate 1 part per unit volume of the binder mixture, approximately 2⅔ parts per unit volume of hot water of approximately 110° F; (c). separating out ⅓ by volume of the binder/water mixture into a separate container, thereby leaving a remaining ⅔ by volume of the binder/water mixture in the mixing container; (d). preparing a mineral/binder/water mixture by adding approximately 50 lbs. of mineral extender to the remaining ⅔ by volume of the bind/water mixture; (e). adding to the mineral/binder/water mixture approximately 6 lbs. of an acrylic binder emulsion; and (f). adding to the mixture obtained in step (e). the ⅓ of binder/water mixture obtained in step (c). Preferably, the mineral extender is selected from the group consisting of kaolin clay, mica, talc, montmorillonite, atapulgite, illite, bentonite or halloysite, and more preferably is a hydrated aluminum-silicate kaolin clay having as aspect ratio of about 11 to 1.

In a preferred embodiment of the method of making the composition, the polyvinyl acetate emulsion is comprised of a mixture of two different homopolymer polyvinyl acetate emulsions with the homopolymer polyvinyl acetate emulsion preferably comprising from about 13% to about 18%, and more preferably from about 14% to about 15% of the composition's total weight. In this same embodiment, the co-polymer polyvinyl acetate emulsion preferably comprises from about 3% to about 6%, and more preferably from about 4% to about 5% of the composition's total weight.

In another aspect of the preferred embodiment of the method of making the composition, the acrylic polymer binder further comprises a pigment and a buffering agent wherein the pigment is a titanium dioxide and the buffering agent is calcium carbonate.

In yet another aspect of the preferred embodiment of the method of making the composition, the process further comprises adding 0.04 lbs of a non-foaming surfactant to the mixture obtained in step (e) and adding approximately 1.36 lbs. of a defloculant, which is preferably sodium silicate to the mixture obtained in step (e).

In yet another aspect of the present invention, there is provided a preferred method of making an artistic medium using the composition of the present invention. The method steps of making the artistic medium comprise: (1) providing a mineral-based coating composition comprising a mineral extender comprising from about 20% to about 36% of the mineral-based coating composition's total weight, water comprising from about 40% to 50% of the mineral-based coating composition's total weight, a polyvinyl acetate emulsion comprising from about 16% to about 24% of the mineral-based coating composition's total weight and an acrylic polymer binder comprising from about 2% to about 5% of the mineral-based coating composition's total weight; (2) applying a sealing coat to a backing material; (3) applying the mineral-based coating composition over the sealing coat; and (4) drying the applied mineral-based coating composition by heating the medium.

In a preferred embodiment, the mineral extender may be selected from the group consisting of kaolin clay, mica, talc, montmorillonite, atapulgite, illite, bentonite and halloysite. More preferably, however, the mineral extender is a hydrated aluminum silicate kaolin clay wherein the kaolin clay has an aspect ratio of about 11 to 1.

In another aspect of the invention just described, the method of making the artistic medium further comprises the step of drying the surface sealing coat prior to the step of applying the mineral-based coating composition.

In yet another aspect, the method of making an artistic medium further comprises the step of surface dressing the mineral-based coating, and in another aspect, the method further comprises the step of applying additional optional topical coatings over the mineral-based coating.

The substrate or backing material to which the coating may be applied may be flexible and may further be hardboard, glass, metal, plastic or acrylic plastic. In those instances where the substrate is flexible, the medium may even be used in conjunction with a laser printer.

In another aspect of the preferred embodiment of making the artistic medium, the polyvinyl acetate emulsion is comprised of a mixture of two different homopolymer polyvinyl acetate emulsions. Preferably, the homopolymer polyvinyl acetate emulsion comprises approximately from about 13% to about 18%, and more preferably from about 14% to about 15% of the mineral-based coating composition's total weight, and the co-polymer polyvinyl acetate emulsion preferably comprises from about 3% to about 6%, and more preferably from 4% to about 5% of the mineral-based coating composition's total weight.

In another aspect of the preferred embodiment of making the artistic medium, the acrylic polymer binder further comprises a pigment and a buffering agent wherein the pigment is preferably a titanium oxide and the buffering agent is calcium carbonate.

In yet another aspect of the preferred embodiment of making the artistic medium, the mineral-based coating composition further comprises a nonfoaming surfactant or a defloculant wherein the defloculant is sodium silicate.

In yet another aspect of the preferred embodiment of making the artistic medium, the mineral-based coating composition further comprises water miscible perlite and the step of making further includes the step of applying a perlite layer over the mineral-based coating composition.

Another aspect of the preferred embodiment of making the artistic medium includes the step of applying a layer of photosensitive material over the mineral base coating composition.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
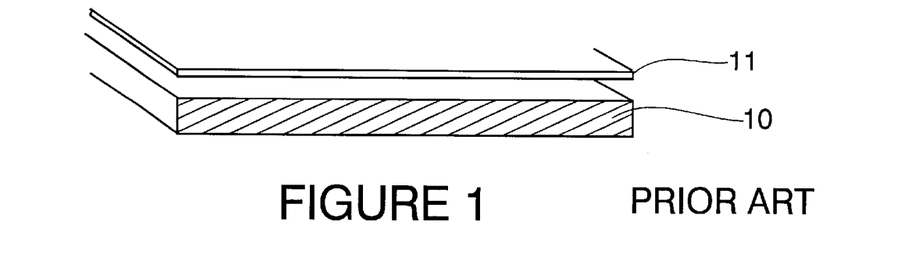
FIG. 1 illustrates an isometric cutaway view of the prior art scraper board as taught in the patent to Dickson.
Figure 2:
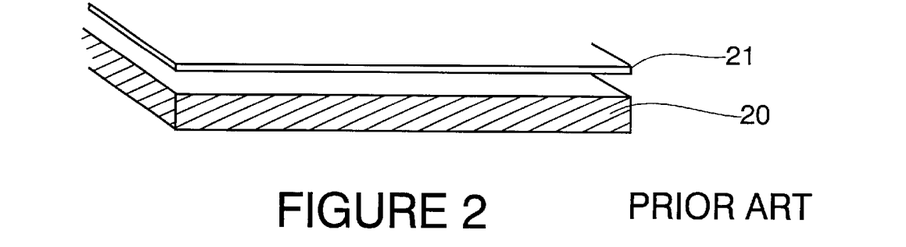
FIG. 2 illustrates an isometric cutaway view of the prior art 6 tile kaolin scratchboard.
Figure 3:
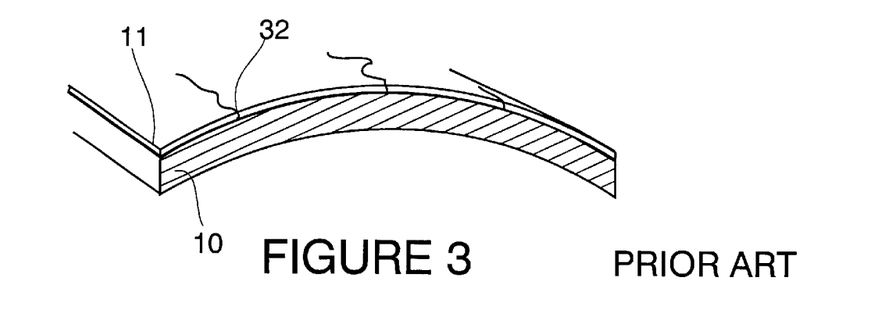
FIG. 3 illustrates an isometric cutaway view of the prior art scraper board of FIG. 1 when bent.
Figure 4:
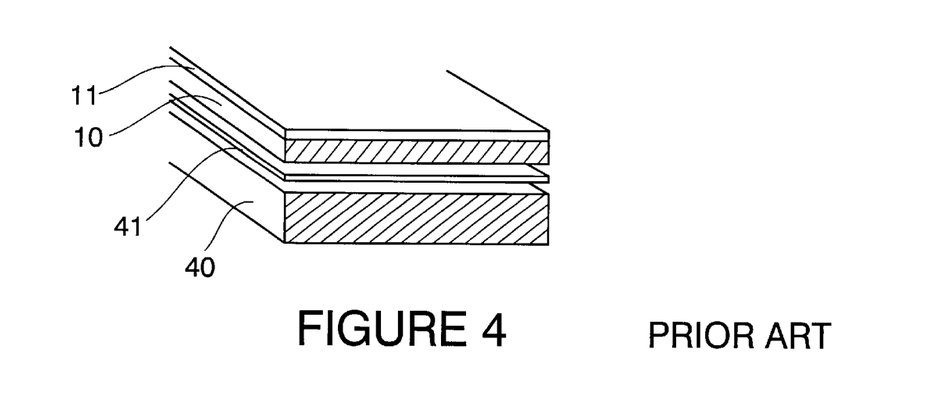
FIG. 4 illustrates an isometric cutaway view of the prior art scraper board of FIG. 1 when being mounted to a rigid substrate.
Figures 5, 6:
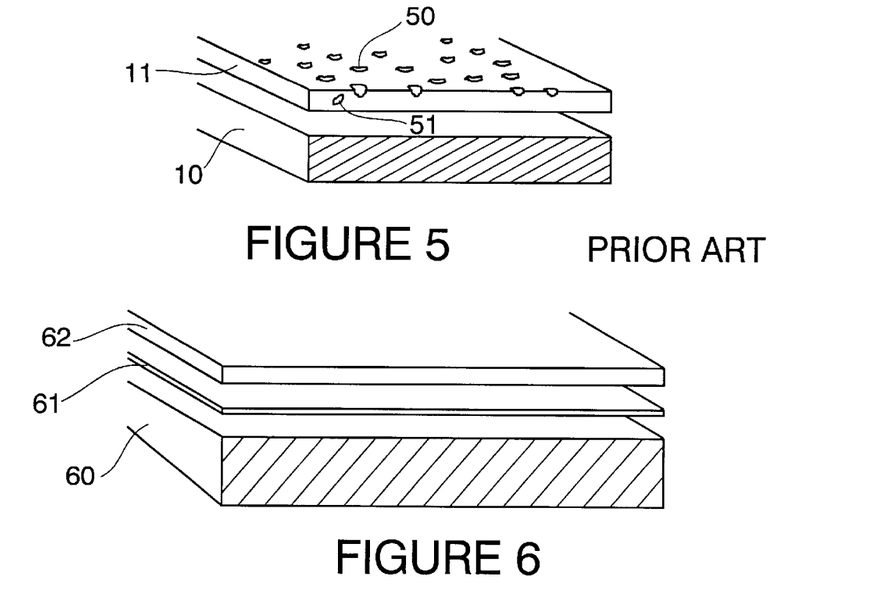
FIG. 5 illustrates an isometric cutaway view of the prior art scraper board of FIG. 1 with particular emphasis on undesirable surface characteristics.
FIG. 6 illustrates an isometric cutaway view of a scratchboard with the coating composition of the present invention applied thereon.

Reference is initially made to FIGS. 1 through 5. FIG. 1 illustrates an isometric cutaway view of the prior art scraper board as taught in the patent to Dickson, FIG. 2 illustrates an isometric cutaway view of the prior art 6 kaolin scratchboard, FIG. 3 illustrates an isometric cutaway view of the prior art scraper board of FIG. 1 when bent, FIG. 4 illustrates an isometric cutaway view of the prior art scraper board of FIG. 1 when being mounted to a rigid substrate and FIG. 5 illustrates an isometric cutaway view of the prior art scraper board of FIG. 1 with particular emphasis on undesirable surface characteristics.

Turning now to FIG. 1, shown is a relatively non-rigid cardboard backing material 10 over which a thin clay coating 11 of unrefined, non-kaolin clay that has a water soluble hide glue, a defloculant and a preservative has been directly deposited by spraying. There is no impermeable sealer layer isolating the clay from the substrate, which is a wood fiber based cardboard of substantial flexibility and significant acid content. As previously mentioned in the Background of the Invention, the deficiencies of this configuration may be categorized with reference to the following qualities previously discussed.

With respect to permanence, the use of an unrefined, non-clay, which has a wide particle size range and that is bound only with a water soluble hide glue to a non-rigid, relatively fragile, unsealed, organic fiber-based cardboard, provides an art substrate that is suspectable to physical degradation over time. The degradation may be due to the effects of UV radiation, to accidental abuse of bending and indentation, or to the deleterious effect that coating acid content may have on pigment and pigment vehicle.

With respect to durability in use, due to the qualities of the configuration described above, the prior art is subject to physical degradation during the execution of art work: (1) when a sharp pencil or pen indents the soft surface while making a line, (2) when repeated applications of water in water media renderings of all kinds dissolve the particle bond thereby allowing previously applied pigment to lift off or clay particles to mix into the color, or (3) when the artist attempts to physically manipulate the wetted clay layer as with abrasive or scratching strokes to remove pigment.

With respect to art rendering, due to the qualities of the configuration described above, effective art rendering is compromised by the presence of pits which can catch the point of a pencil or ink pen as a line is being rendered and can diminish artistic control over a scratching or abrading stroke used to create highlight detail by making it rough and uneven. Again the presence of indentations caused by previously executed lines in the relatively soft surface can prove problematical in removing the lines or drawing over them.

With respect to health hazard, due to the use of unrefined clay which contains significant amounts of quartz crystals, any dust producing operations on the surface such as abrading or scratching would pose a threat over time of developing the respiratory disease, silicosis.

Turning now to FIG. 2, shown is a hard, relatively inflexible, unsealed backing material 20, such as Masonite, upon which is deposited a layer of clay mixture 21 consisting of unrefined kaolin clay of a wide particle size range bound only with a PVA is deposited.

As previously mentioned in the Background of the Invention, the deficiencies of this configuration may likewise be categorized with reference to the same qualities previously discussed above.

With respect to permanence, the above described configuration compromises the ability of the coating to maintain its integrity over long term exposure since the UV radiation bleaches out the organic impurities, which in turn changes the original color and values of the art work as originally executed by the artist. Additionally, however, the coating cannot be applied to an impermeable slick substrate because of the deficiencies in adhesive strength of the binder as previously discussed. Thus, without being able to use a sealer to isolate the substrate from the coating, the acid from the acid bearing organic fiber substrate may leach into the coating through acidic ion absorption and eventually degraded the pigments and pigment vehicles. Also, the lack of a buffering agent in this configuration results in a coating of acidic pH, again, a property deleterious to long-term art preservation.

With respect to durability, the relatively soft, non-resilient surface suffers indentation during the normal use of pencils and pens in art rendering. Also, due to the deficiency in particle bond strength when wet, the coating suffers dissolution of the particle bond under physical manipulation conditions of normal art rendering.

With respect to art rendering, the light brown color of the clay body imparts its color and value to colors laid down by the artist. Also lack of a white primer/sealer under the clay results in show through of the dark hardboard surface when the surface is wetted, again imparting considerable color and value change to a brush stroke. Also the pitted surface causes art rendering problems noted above.

With respect to health hazard, the use of an unrefined Kaolin containing significant amounts of quartz crystals with the corresponding threat of silicosis.

Turning now to FIG. 3, shown is the scraper board of FIG. 1 when bent. The backing material 10 is flexible, but the clay coating 11 is inflexible and poorly bound to the backing material 10. Therefore, when the scraper board is bent, cracks 30 are created in the clay coating 11. These cracks are common in the Dickson scraperboard due to the fragile nature of a thin clay layer on the flexible and flimsy cardboard. Increased durability of the scratchboard of the present invention is partially due to an increase in uniform clay thickness on a hard board. Furthermore, pits are a result of exposure of bubbles that have come to the surface either in the manufacturing process or in the scraping or sanding of the surface. Bubbles are a result of three production faults: (1) the spraying process, wherein the clay mixture is sprayed on the backing material (individual clay droplets forming bubbles when they impact the clay surface), (2) the lack of the use of a surfactant to reduce the surface tension, (3) the use of a non-uniform clay particle clay mixture and (4) lack of oven drying that tends to burst bubbles.

Another problem with the Dickson scraper board more thoroughly described in the Background of the Invention is that it is difficult to mount the cardboard-backed scraper board to a rigid board for permanent display or storage. This is illustrated in FIG. 4, wherein a rigid board 40 must be bound to the cardboard backing material 10 by use of a glue 41. If the glue 41 is water-based, water can leach through the cardboard backing material 10 to the clay coating 11 above, causing harm to the artist's work. Alternatively, if the glue is non water-based, such as rubber cement, the glue can lose contact with the cardboard backing material 10 over time, causing warping of the cardboard backing material 10 and bubbles to appear between the cardboard backing material 10 and the rigid board 40.

Turning now to FIG. 5, the spraying process is shown to create bubbles in the clay coating 11 because air is introduced in the misting process. These small, often invisible bubbles sometimes coalesce during drying to produce larger bubbles that may affect art quality. These bubbles may rise to the surface to cause pits 50 or may remain buried to cause internal air pockets or bubbles 51.

Bubbles can be minimized through use of a surfactant in the clay mixture. Surfactants work by reducing the surface tension of the mixture, thereby reducing the tendency of the mixture to entrain air pockets. By failing to use a surfactant, the surface tension retains the bubbles created during deposition instead of allowing them to escape or burst.

Disparate clay particle sizes found in unrefined clays promote higher viscosity in the clay solution for a given amount of liquid, which in turn creates higher surface tension by introducing very small particles and shortening storage life by introducing heavy particles that settle out in the solution. Mixing such a solution does not improve the viscosity and, in fact, increases the number of bubbles trapped within the solution. Thus, the degree to which the particles of the clay are varied also bears on the problem of air entrainment.

Cracks are present in the scraper board of Dickson due to the fragile nature of the thin clay layer on the flexible cardboard. Increased durability of the scratchboard of the present invention is partially due to an increase in clay thickness. The use of a curtain coater allows a very thick layer (e.g. at least approximately 20 wet mils) of clay mixture to be deposited on the sealer coat while retaining high surface quality.

Pits are a result of exposure of bubbles which have come to the surface either in the manufacturing process or in the scraping or sanding of the surface. Bubbles that fail to rise to the surface can be potentially more harmful because they are not apparent to an inspector at the time of manufacture and therefore may be found in scratchboards that have passed quality control, only to be found wanting in the artist's eyes. Furthermore, manipulation by the artist may uncover these bubbles, making the artist's work more difficult and compromising the qualities of the surface. The number of erasures that the artist can make and the vigor with which the artist can manipulate the board are limited due to the thinness of the clay layer.

Prolonged exposure to the clay dust in the manufacturing process and/or artistic use can cause silicosis due to the presence of quartz crystal impurities in the unrefined clay. Resurfacing of old boards causes airborne silicates which can lead to silicosis over prolonged exposure, thus making the scratchboard of the present invention more ecologically sound.

Turning now to FIG. 6, illustrated is an isometric cutaway view of a scratchboard having the coating composition of the present invention applied thereon. Shown are a rigid backing material 60. The rigid backing material 60 may be a hardboard, which is defined herein as a board constructed of pressed individual fibers. Hardboard can be of softwood (conifers, for instance) or hardwood (oak or beech, for instance). Hardwood fiber is a preferable substrate on which the coating composition of the present invention may be applied for two reasons. First, hardwood has a shorter fiber length; therefore the surface is more uniform. Second, hardwood is less acidic than softwood; therefore there is a lower chance of chemical reactions between the hardboard backing material and the sealer coat.

A sealer coat 61 is applied over the backing material 60 to chemically and physically isolate the backing material from a clay mixture 62 deposited over the sealer coat 61.

The mineral-based coating composition of the present invention preferably comprises a mineral extender, water, polyvinyl acetate emulsion (PVA), and an acrylic polymer binder. The mineral extender may be any type of mineral silica-based composition such as those used in refractories or ceramics. The mineral extender is preferably delaminated and comprises from about 20% to about 36% and more preferably from about 30% to about 32% of the coating composition's total weight and preferably has an aspect ratio, i.e., length to thickness of the platelets, of 11 to 1. For example, the mineral extender may be a kaolinite, talc, mica, montmorillonite, atapulgite, illite, bentonite or halloysite. More preferably, however, the mineral extender is a delaminated hydrated aluminum silicate kaolin clay that is screened to a particle size ranging from about 0.4 microns to about 6 microns with an median particle size of about 2 microns. The kaolin clay is of a brighter white than previously used. This is important for illustration purposes that requires the whitest possible artistic surface.

The refinement process removes organic and inorganic impurities from the clay body giving a whiter color and gives an advantage in art rendering by giving colors applied to the surface a truer hue, thereby offering greater contrast for reproduction of art work. The use of the refined delaminated kaolin, which, unlike the impurity laden, non-delaminated 6 kaolin that tends to bleach out to a lighter color over time, remains unchanged in color. This refinement provides an advantage in permanence with respect to the maintenance of original color and value when executed by the artist.

As is known, most clays are comprised of layered platelets that are adhered together to form thicker particles of the clay. The delamination process, which is a water wash process, breaks up these layered platelets into much thinner platelets, which facilitates screening to uniform particle size, and provides for consistent quality control regarding density variation, flexibility and general uniformity of the surface. In regard to toolability, it provides smooth, consistent tooling such as in scratching or scraping the surface in pigment removal or in surface dressing the homogenous coating to give it a surface texture or surface of an even level. Further, the homogenous dispersal of like particles throughout the coating provides a higher degree of flexibility and even color pigment acceptance in art rendering without spotting due to irregularities in surface density.

While the delamination and screening to uniform particle size is integral to the above qualities in art rendering, it was also unexpectedly found to greatly aid the application process in regard to: (1) coating drying time in that approximately ⅓ less water is required for total wetting of the clay particles and thus for a given viscosity of coating mix, (2) binder quantity reduction by approximately ⅕ due in like manner to the reduction in total particle surface area coverage, and (3) reduction of surface tension of the coating liquid caused by large number of very small particles in that fewer bubbles are entrained in the mix during application. Those that do remain easily rise to the surface of the coating and burst as the coated substrate passes through the forced air drying ovens, thus resulting in a dried surface without pitting—a marked quality improvement over the prior art.

Preferably, the water component, which preferably has a pH of approximately neutral to slightly basic (e.g. a pH range of approximately about 7.0 to about 8.5), comprises from about 40% to about 50%, and more preferably from about 44% to about 46% of the composition's total weight.

The polyvinyl acetate emulsion (PVA) preferably comprises from about 16% to about 24%, and more preferably from about 19% to about 20% of the composition's total weight. Preferably, the PVA is comprised of a homopolymer polyvinyl acetate emulsion that ranges from about 13% to about 18%, and more preferably from 14% to about 15% of the coating composition's total weight and a co-polymer polyvinyl acetate emulsion that comprises from about 3% to about 6%, and more preferably from about 4% to about 5% of the coating composition's total weight. The homopolymer polyvinyl acetate emulsion component provides a water absorptive bond matrix between the clay particles giving the coating good absorptive qualities.

Moreover, the homopolymer polyvinyl acetate emulsion used in the present composition is preferably an opaque liquid that is white in color and a slight acetic odor, miscible in water, has a freezing point of 0° C., a boiling point of about 100° C., a vapor pressure of 17.5 mm Hg at 20° C., a vapor density of 0.62 (water), air=1, a specific gravity of from about 1.08 to about 1.10, a pH of from about 4.0 to about 5.5 at 25° C. and a volatile organic content of approximately 3 gms/liter, less water. An example of the homopolymer that is commercially available is "ELMER'S GLUE-ALL", product number E960, manufactured by Borden, Inc. at 180 East Broad Street, Columbus, Ohio 43215.

The co-polymer polyvinyl acetate emulsion used in the present composition gives improved adhesion to the substrate of impermeable sealed hardboard as well as to alternative substrates such as primed metal, plastic and glass, thus enhancing the permanence qualities of the coating. The co-polymer also improves upon the qualities of flexibility and toolability affecting permanence, durability and art rendering as defined above. Additionally, the co-polymer was found to strengthen the bond matrix, offering improved flexibility and better wetting resistance. The preferred co-polymer acetate emulsion used in the present composition is milky white in color with a mild odor, soluble in water, has a vapor density of less than 1 (water), a specific gravity of about 1.095, a pH of about 5.0, a boiling point of about 100° C. and a volatile organic content of approximately 48% by weight. An example of the co-polymer that is commercially available is "WELLBOND ADHESIVE" manufactured by Frank T. Ross and Sons Limited at 6550 Lawrence avenue East, West Hill, Ontario, Canada M1E 4R5.

The preferable acrylic polymer binder used in the present composition is a white, opaque thick paste Gesso and preferably comprises from about 2% to about 5%, and more preferably from about 3% to about 4% of the composition's total weight. The acrylic polymer binder further preferably comprises a white pigment, such as a Group II metal dioxide such as titanium dioxide, zirconium dioxide or hafnium dioxide and a buffering agent, such as calcium carbonate. The pigment whitens the resulting surface, thereby improving upon the art rendering by reducing the effect a slightly colored ground has in color application and by providing greater value contrast in artwork reproduction. The calcium carbonate raises the pH of the coating to approximately 7.0 to 7.5, neutral to slightly basic. This pH enhances the permanence and chemical stability of the composition by retarding acidic degradation of color pigments or pigment vehicles over the life of the art work. Moreover, the slight basicity provides a buffering action that counteracts the absorption of acid from environmental sources. Examples of the acrylic binder used in the present composition that are commercially available are: (1) "UTRECHT ARTIST GRADE GESSO" manufactured by Utrecht Manufacturing Company at 33–35th Street, Brooklyn, N.Y. 11232; (2) "GRUMBACHER PROFESSIONAL GESSO", manufactured by Grumbacher at 100 North Street, Bloomsbury, N.J. 08804-0068; and (3) "LIQUIATEX ACRYLIC GESSO", manufactured by Binney & Smith at 1100 Church Lane, Easton, Pa. 18042.

The acrylic polymer binder component provides an improved particle bonding matrix that renders the bond less subject to particle bond disintegration upon wetting or upon physical manipulation while wet and thus, positively affects permanence, durability in use and art rendering. Moreover, it improves adhesion to impermeable slick substrates such as sealed hardboard and to alternative substrates such as metal, plastic and glass.

In addition to the components discussed above, the coating composition may also include the additional components of a surfactant or a defloculant. The surfactant, a non-foaming wetting agent, lowers the surface tension of the coating mix, thereby allowing bubbles that do become entrained in the coating layer upon application to more easily burst when passed through the forced air drying ovens, thus directly affecting art rendering by eliminating pits. When present in the coating composition, the surfactant preferably comprises from about 0.03% to about 0.04% of the coating composition's total weight.

The defloculant, which is preferably a sodium silicate, facilitates application and speeds the dry time of the coating by reducing the amount of water needed to bring the coating mix to a given viscosity. Additionally, it creates a uniform dispersal of clay particles throughout the coating, thus improving upon uniformity of the surface and toolability. When present in the coating composition, the defloculant preferably comprises from about 0.80% to about 0.9% of the coating composition's total weight.

A preferred embodiment of the coating composition of the present invention may be prepared in accordance with the following preferred method of preparation.

In a mixing container, prepare a binder and water mixture by mixing approximately 3 parts per unit volume of the homopolymer polyvinyl acetate emulsion with approximately 1 part per unit volume of the co-polymer polyvinyl acetate, i.e., about 23.67 lbs of the homopolymer polyvinyl acetate emulsion with about 7.56 lbs of the co-polymer polyvinyl acetate. To each approximate 1 part per unit volume of binder mixture added 2⅔ parts per unit volume, i.e., about 72.48 lbs, of hot water at 110° F. and slowly mix in the hot water. This should be thoroughly agitated until there is consistent dispersion and suspension of the white binders in the water. This results in a binder/water mixture.

Separate out ⅓ by volume of the previously prepared binder/water mixture into a separate container to be set aside and used later at the end of the mixing process.

To the ⅔ binder water mixture remaining in the mixing container, add approximately 50 lbs of the mineral extender, preferably kaolin clay having a median particle size of about 2 microns. Agitate the mixture until a thick paste is formed. Continue to agitate the mineral/binder/water paste for 20 to 30 minutes until all of the mineral extender is mixed in and a smooth paste results.

To the mineral/binder/water paste obtained above, slowly add while mixing, approximately 6.28 lbs. of the acrylic binder emulsion containing the calcium carbonate buffering agent and the titanium dioxide pigment component.

To the mixture just obtained above, add slowly approximately 1.36 lbs. of the defloculant, preferably sodium silicate. The defloculant should be divided and added in 3 parts, each time mixing until the defloculant is completely dispersed in the paste.

After addition of the defloculant, add slowly and with agitation approximately 0.04 lbs of surfactant to the mixture.

To the mixture just obtained above, add slowly and with agitation, the remaining ⅓ of the binder/water mixture that was set aside as set forth above.

The sealer coat 61 which is preferably a styrenenated acrylic emulsion allows the coating composition 62 to remain pH neutral, for whatever acidity that resides in the backing material 60 is not allowed to leach through to the coating composition 62. Not only is it desirable that the clay mixture remain pH neutral to eliminate unwanted chemical reactions with the artist's pigments or colors, the various layers that constitute the scratchboard of the present invention would tend to separate due to formation of salts between the backing and the clay mixture coating as a result of chemical reactions.

Next, the mineral extender component of the coating composition 62 is passed through a mesh screen to filter out discontinuities. "Discontinuities," for purposes of the present invention, is defined as bubbles, debris, lumps of undissolved clay or other incompletely mixed ingredients present in the mixture. The mesh screen further mixes the solution.

The use of a neutral sealer coat further (1) prohibits the backing board's color from soaking through from beneath, (2) permits the use of water-based media without fear of the water soaking through to the backing and (3) allows the addition of photosensitive chemicals on the surface for photographic purposes without chemical reactions taking place.

In a preferred embodiment of the present invention, the coating composition can be applied over the sealer coat to achieve different characteristics for the coating composition. First, the coating composition can be deposited on hardboard sealed on the mineral coated side with sealer coat, and offered with the original surface (as it comes off the drying rack), a random orbital sanded surface using 220 grit, and a sandblasted surface using 120 grit abrasive; and cut to various standard frame sizes and edge dressed. This produces the scratchboard structure found in FIG. 6.

Second, the coating composition can be deposited on hardboard sealed on both sides and on the edges to enable immersion in water or photochemicals without leaching of chemicals and stain from the hardboard. In accordance with this second embodiment of the present invention, uses for photographic printmaking offer many new advantages to the photographer, principal of which is a more physically durable and chemically inert printing plate of enhanced permanence, a reworkable print after printing with scratching tools and paint application, a print surface of large size capability, and ease of framing without glass. The advantages of this second embodiment that distinguish it from the prior art is the immersibility required for the developing and fixing baths, particularly with the use of the acrylic plastic supporting base, and, the whiter surface than the prior art 6 kaolin scratchboard without the pit defects. This produces the embodiment found in FIG. 9.

Third, the coating composition can be deposited on 3/64 inch acrylic plastic, the sealer coat and the alternative surface texturing techniques being the same as for the hardboard base support. In accordance with this embodiment of the present invention, the manufacturing process using acrylic plastic requires the modification of sanding the side to be sealed with 100 grit paper on a random orbital sander to give the slick surface tooth enough for good bonding of the sealer coat.

The advantages of this third embodiment of the present invention include: (1) a clay surface on a flexible base support which, when flexed into a bend of 4 inches in diameter or less will neither crack the clay surface nor cause it to flake off the base support; and (2) total and repeated immersibility in water or photochemicals without loss of surface integrity when subsequently dried.

The embodiment just described above provides the illustrator an art board with the surface qualities described above, but which can be reproduced using the drum-type laser printers in common use in the industry. This embodiment also provides the photographer a printing plate with the qualities of permanence, reworkability, and, unlike the hardboard, a relatively lightweight print support. This produces the embodiment illustrated in FIG. 10, wherein the backing material 60 is a semi-rigid plastic material. The plastic may be acrylic, styrene, polyvinyl chloride or other similar materials. Note that the sealer coat 61 is not employed to chemically isolate the backing material 60 from the coating composition 62, but rather to provide proper surface characteristics for bonding of the coating composition 62 to the backing material 60 (as with a primer).

Figure 8:
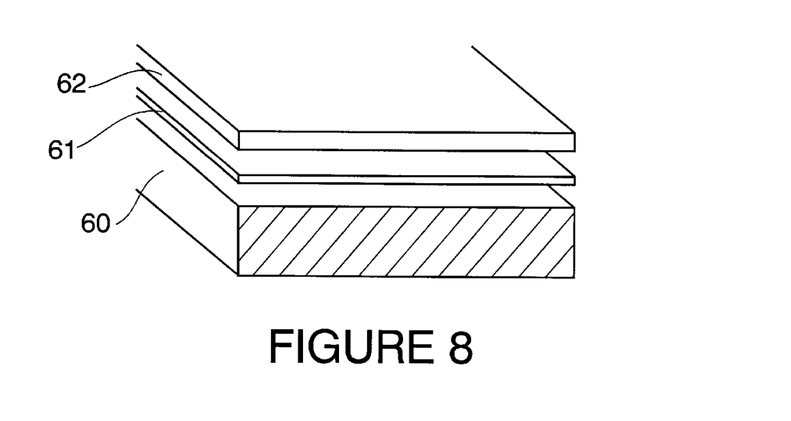
FIG. 8 illustrates an isometric cutaway view of the coating composition of the present invention as modified to function on a watermedia board.

Fourth, a clay surface containing a combination of expanded ground, perlite ($SiO_2$ and $AlO_2$) and coating composition 62 can be deposited on the sealer coat 61.

The advantage of this alternative embodiment is, for watermedia artists primarily, provision of an art surface with the advantages described above, though with more limited reworkability with scratching and scraping tools than the clay-only scratchboard (but certainly more than paper), but with a water-absorbing quality similar to watercolor paper. This allows the artist to execute transparent washes in a conventional way in addition to performing opaque work with water media. Further, the chemical composition of the perlite is notably stable under the influence of acids, alkalies and exposure to ultraviolet rays, thus enhancing the stability of pigments on the surface and thus directly enhancing the permanence of the artwork.

Thus, this alternative embodiment makes use of some of the features of the first embodiment, namely permanence of the clay surface on a supporting base, repeated immersibility or wetting ability, greater choice of larger sizes, a modified formulation of binder appropriate for the addition of the expanded perlite. New to the prior art, by virtue of the addition of the expanded perlite, is a coating surface which approximates the absorbent surface of water color paper. This produces the embodiment illustrated in FIG. 8, wherein the perlite is entrained in the clay coating 62.

Figure 7:
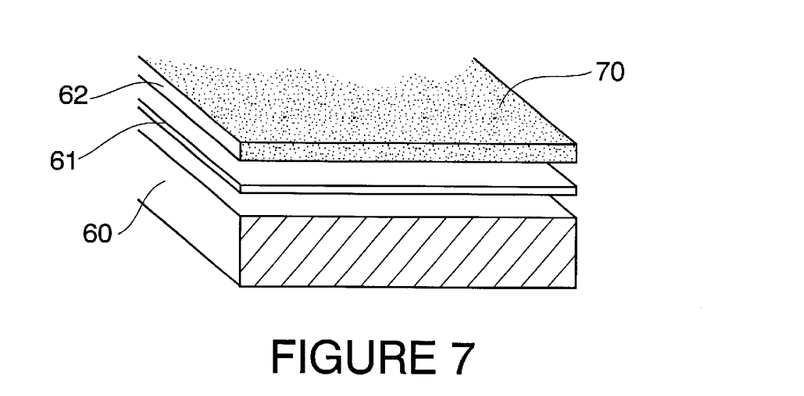
FIG. 7 illustrates an isometric cutaway view of the coating composition of the present invention as modified to function on a pastel board.

Fifth, a coating surface 62 the same as in the fourth embodiment, above, can be deposited on the sealer coat 61, but with the addition of a coarser grade of expanded, ground perlite grit to the surface effected by coating the clay surface with a diluted adhesive and evenly distributing the perlite onto the wet adhesive.

This fifth alternative embodiment provides a coating surface of more abrasive quality on the surface yet with a layer softness, by virtue of the added expanded perlite, a soft absorbent material in the clay layer, thus approximating the tactile qualities of paper. These features are of most advantage to pastel artists to whom the resilient touch of the surface is important in the control of the "stroke" they are able to execute. The added abrasiveness of the surface by virtue of the added expanded perlite facilitates the "pulling off" of pigment from the pastel stick as well as the adhesion of the powdered pigment to the surface. This surface may be scratched back into to a somewhat lesser degree than with the clay-only scratchboard, but offering the pastel artist, for the first time, the scratchboard advantage in working with dry pigments. This produces the embodiment found in FIG. 7, wherein the expanded perlite grit is shown as a plurality of particles 70 deposited on the coating composition 62.

Important to note is that these coatings can be applied to surfaces other than a rigid backing material, e.g., interior walls, furniture, wooden and unglazed ceramic objects to create sculpture with scratchboard surface qualities.

In accordance with the objectives of this invention, to improve upon the prior art from an artistic use standpoint and to create new media for artistic expression, the features of these preferred embodiments attack the problems of permanence, versatility of use, quality of the surfaces, innovation of new clay surfaces and health hazard to factory workers and users of the product.

Turning now to FIG. 7, illustrated is an isometric cutaway view of the present invention as modified to function as a pastel board. The ability to coat the above "watercolor board" with an abrasive coating of fine perlite sand particles 70 provides a surface for pastel and charcoal artists that has the unique feature of "feeling soft to the touch" like paper, the preferred based for pastel except for paper's notorious impermanence.

Turning now to FIG. 8, illustrated is an isometric cutaway view of the present invention as modified to function as a watermedia board. The ability to incorporate the clay perlite in its expanded form along with the coating composition provides a surface approximating the texture and absorbency of water color paper allowing conventional water media techniques including transparent washes with the permanence, and other advantages of the clay surface on a supporting base.

Figure 9:
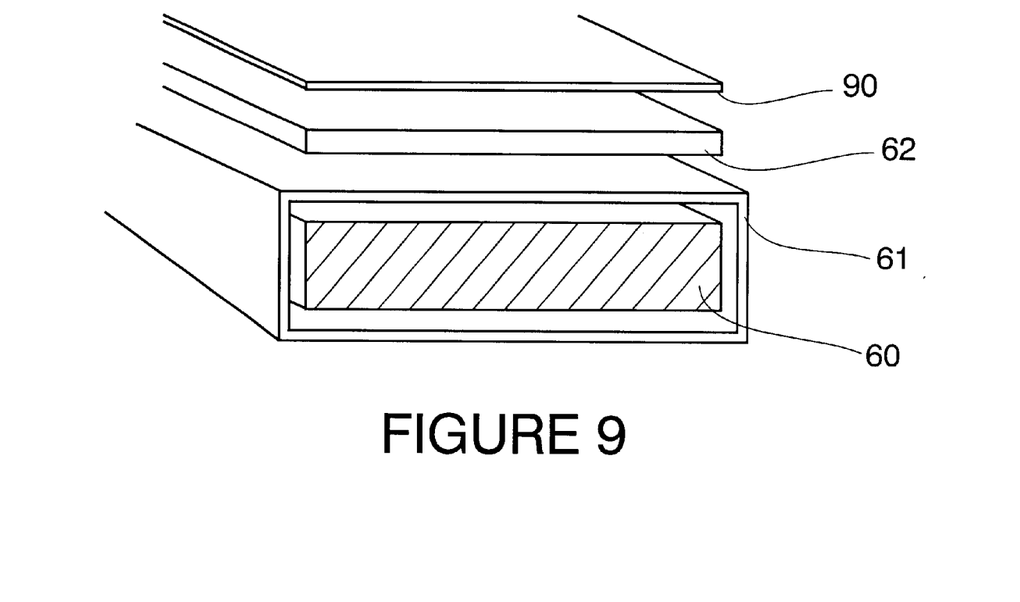
FIG. 9 illustrates an isometric cutaway view of the coating composition of the present invention as modified to function on a photographic board.

Turning now to FIG. 9, illustrated is an isometric cutaway view of the present invention as modified to function as a photographic board. The sealer coat 61 has been extended to completely surround the backing material 60. This allows the scratchboard to be completely immersed in fluid without fear of wetting the backing material 60. Following addition of a layer of coating composition 62, a layer of photosensitive material 90 is applied by conventional deposition techniques in a darkened room.

Figure 10:
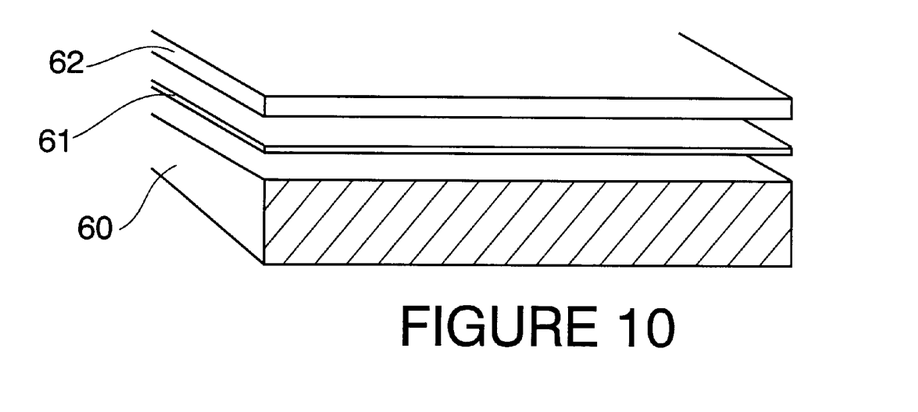
FIG. 10 illustrates an isometric cutaway view of the coating composition of the present invention as modified to function on a laser printer board.

Turning now to FIG. 10, illustrated is an isometric cutaway view of the present invention as modified to function as a laser printer board. The coating composition of the present invention provides the sufficient degree of flexibility to allow the coating composition to be bent in a curve when dried. The ability to apply the coating composition of the present invention as a surface to a 1/16" plastic supporting base allows, by virtue of the improved binder formula greater flexibility to the coating composition 62, and adhesion to the base, allowing artwork to be reproduced in the widely used drum-type laser printers requiring the original art work to be bent around the drum, as well as providing an immersible, lighter weight photoplate.

Figure 11:
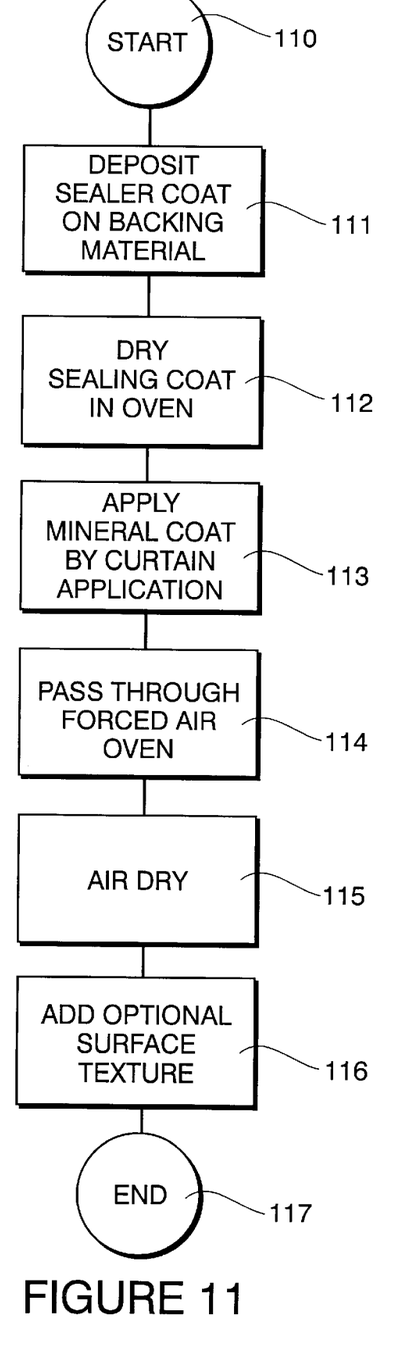
FIG. 11 illustrates a block diagram of the method of manufacturing the artistic media of the present invention.

Turning now to FIG. 11, illustrated is a block diagram of a preferred method of manufacturing an artistic media using the coating composition 62 of the present invention. The method begins at a start block 110 wherein the backing material has been readied for application of the sealing coat. The substrate to be coated (e.g., hardwood, acrylic, glass, metal, etc.) is fed into the front of a conveyor. Then, the sealing coat is applied to the backing material in step 111.

The use of a sealer coat on the supporting base provides: (1) a more effective block to ion transfer from the acidic hardboard backing to the coating composition surface than in the prior art 6 tile kaolin scratchboard which used diluted adhesive, insuring art pigment stability over time, a consideration critical for fine art permanence, (2) less darkening and color change in the wetted coating composition surface during watermedia applications than the old 6 kaolin scratchboard due to dark hardboard color "show-through"because of saturation down to the board surface, (3) better bond to the coating layer, (4) a smoother, more impermeable base for the coating composition which results in a smoother dried coating, requiring no further elaboration for artistic use and (5) when coated on the back and edges, as well, provides total immersibility without chemical leaching from the hardboard, of photoprint developing importance.

In addition, the sealer coat allows for a correspondingly smooth surface coating, making smooth application critical to quality in the surface coat. In addition, the sealer coat provides a more than adequate bond between it and the coating composition surface, witnessed by an adherence test, in which the material is subjected to repeated blows, coating surface side up, on a hard edged object such as a table edge, looking for separation along the surface coating/sealer coat interface. In addition, the sealer coat acts as an impermeable block to water saturation of both the sealer coat and the hardboard surface underneath, in the described embodiment, thus preventing the dark color of wet hardboard to show through the sealer coat or through the wettable surface coat which would register as a color and value change on the coating surface when wetted in normal application of water borne pigments, the same holding true for oil-borne pigments. Next, the sealing coat is dried in ovens in step 112. This prepares the backing material for deposition of the clay mixture in step 113.

The selection of a clay, a delaminated kaolin, ($AlO_2$ and $SiO_2$) is both chemically and physically refined compared to both tile 6 kaolin and English-mined China (also a kaolin).

The delaminated kaolin clay's lack of impurities, extremely uniform particle size and the separateness of the individual clay platelets provide: (1) a whiter surface than 6 tile, and an equally white surface as the coating of Dickson but warmer in color, particularly when wetted, due to lack of mica particles which are bluish in color, (2) a smoother and more uniform surface allowing scratching and scraping strokes of more control than with the prior art, (3) a lack of surface pits thereby providing a smooth surface and preventing the appearance of dark spots in artwork, an improvement in quality (particularly in pen and ink work), (4) a materials savings due to decreased amount of binder required (½ the binder as with prior art 6 kaolin scratchboard), (5) a cost advantage in reduced drying time due to the delaminated kaolin requiring less water for a given viscosity (⅖ less water than the prior art 6 kaolin scratchboard), (6) an improvement of shelf life over unrefined clays due to its particles maintaining a uniform dispersion in the glue/water mix over a longer period of time, (7) an elimination of a health hazard to factory workers as well as artists due to lack of silicosis caused by quartz particles in the clay dust, unlike all other prior art and (8) a more uniform curtain formation. This is critical when using a curtain applicator.

The manner in which the clay mixture is applied is critical to producing the product because of the thickness of the clay mixture and the need to produce these products on a mass scale. One preferred feature, then, is the novel adaptation of existing coating technologies to the needs of the invention including, a curtain coater for the clay surface application and a bank of drying ovens to accelerate the drying process, all along a single conveyor thus greatly increasing the speed and quality control over the prior art. The curtain coater can be, for instance, an Ashdee curtain coater manufactured by George Koch Sons, Inc.

The advantages of this one-coat method of clay surface application over what is used for the prior art, i.e., consecutive sprayed applications of material on the base support, has the advantages of greater speed, less maintenance to achieve consistency, more flexibility in its ability to handle various types of base supports of various sizes up to 4 feet by 8 feet and in its ability to easily adjust coat thicknesses. In prior art, only a limited thickness has been achieved due to the spraying technology used.

The backing material, either hardboard or acrylic plastic or other rigid or semi-rigid supporting base, passes through the curtain coater where the clay coat is deposited and then immediately enters the main drying ovens. The ovens provide an initial amount of drying before the panels are stacked in drying racks at the end of the conveyor line, thus shortening the stack drying time by approximately two thirds. In the alternative, the ovens can eliminate stack time by completely drying the surface. The forced air covens also provide the necessary function of ridding the wet clay layer of bubbles which would otherwise result in unwanted pits in the finished dry surface.

Next, the curtain-applied clay mixture is partially or completely dried in ovens in step 114. Applying an oven-drying process reduces drying time and eliminates pit-causing bubbles in the wet clay layer while passing through the ovens. The freshly-coated clay mixture goes directly into drying ovens. The bubbles, when heated in the ovens, expand, rise to the surface and burst leaving the dried clay surface completely free of the unwanted pits and latent bubbles, a definite improvement in surface quality over the prior art, all of which display varying amounts of pit defects.

Next, the surface textures are stacked and air dried in step 115. Stack drying times vary with the size of panels, the type of panel, the amount of air circulation, either natural or mechanically induced, the clay surface thickness, and the relative environmental humidity. Two to twelve hours is usually adequate.

Next, optional surface textures are applied in step 116. Optional surface treatments may be performed including: (1) sanding with various grits and with various apparatus to give the clay surface a variety of sanded textures, including a random orbital pattern using a pneumatically-driven palm sander with at least 10,000 orbits per minute, (2) achieving a cross-sanded pattern which simulates a linen-like texture on the surface achieved with a belt sander of various alternative configurations applied to the surface first in one direction followed by a direction 90° from the first, (3) any other hand or appliance type sanding method applied at the discretion of the artist in the studio or (4) sandblasting the surface, again with various gift sizes from 220 grit to 50 grit, accomplished in a blasting cabinet or room with either a simple suction feed or pressure feed sandblaster.

Many other alternative methods may be used to texture the clay surface including several used in prior art such as pressing a texture configuration into the surface with templates made of stone, metal, plastic fiber, etc. In accordance with the present invention, a physical property of the clay surfaces of this embodiment which facilitates pressing a texture configuration into the surface is that, when wetted in a uniform manner, the clay coat is temporarily softened facilitating the imprint. When it is subsequently dried, the integrity of the original surface returns, and the process then ends in end block 117.

Experimental Results

Two different experiments (a wet abrasion resistance test and a flexibility test) were conducted on three different coating compositions, including the coating composition of the present invention. The coatings are: the present composition (PC), 6 Tile Koalin (6TK) and the Dickson coating (DC).

Wet abrasion resistance is defined herein is the surface's resistance to scratching or scoring with a sharp object. The testing apparatus was comprised of three #16 needles affixed to a weight platform made of wood or other suitable flat support. The needles were arranged in the center of the board in an 8" diameter circle extending downwardly from the bottom of the platform by ½". Weight was added to the top side of the platform until the combined weight of the apparatus was 3.5 pounds (1.5 Kg).

The weighted platform was then gently placed on the respective wet clay coatings with the needles bearing the weight of the platform and coming into contact with the clay surface. The platform was then pulled across the coating surface at a constant velocity of 1 ft/sec. As the device was pulled across the respective coating surfaces, it took more force for the needles to pull the clay off the substrate in the present composition as compared to the other compositions. The amount of force necessary was measured with the results as follows:

The PC coating required 1.5 to 1.7 Kg of force to pull the platform across the coating surface; the PTK coating required 1.5 to 1.7 Kg of force to pull the platform across the coating surface and the DC coating required 0.3 to 0.4 Kg of force to pull the platform across the coating surface.

The second test that was conducted was the flexibility test that was conducted in an environment having 10% relative humidity or less. The respective coatings were applied to a thickness of approximately 20 mils on a 3 mil thick sheet of flexible plastic and allowed to dry. A 1 inch strip approximately 10 inches long of the coated flexible plastic was cut from each sample. The strips were dried in an oven until the coating moisture content was 5% or less. The dried strip were then gradually bent into reducing diameter circles until the first cracked appeared and the resulting diameter was noted. This was repeated three time for each sample and an average was taken with the results as follows:

The PC coating could be bent into a circle having a diameter ranging between 2 inches to 3 inches in diameter without cracking. The 6TK coating could be bent into a circle having a diameter of 12 inches without cracking and the DC coating could be bent into a circle having a diameter of 12 inches without cracking. Thus as seen, the coating composition of the present invention has a much higher degree of flexibility.

From the above, it is apparent that the present invention provides a mineral-based coating composition, a method of making that composition and a method of making an artistic medium using the coating of the present invention.

Although the present invention and its advantages have been described in detail in the foregoing detailed description, those skilled in the art should understand that the detailed description is given by way of illustration only and that various changes, substitutions and alterations can be made herein without departing from the spirit and scope of the invention as defined and limited solely by the appended claims.

What is claimed is:

1. A method of manufacturing media for artistic expression, comprising:
    providing a mineral-based coating composition comprising a kaolin clay, mica, talc, montmorillonite, atapulgite, illite, bentonite or halloysite mineral extender, water, a polyvinyl acetate emulsion and an acrylic polymer binder;
    applying a sealing coat to a backing material;
    applying an at least about 20 wet mil layer of said mineral-based coating composition over said sealing coat; and
    drying said applied mineral-based coating composition by heating to produce media for artistic expression.

2. The method of claim 1 wherein said mineral extender comprises from about 20% to about 36% of said coating composition's total weight, said water comprises from about 40% to about 50% of said coating composition's total weight, said polyvinyl acetate emulsion comprises from about 16% to about 24% of said coating composition's total weight and said acrylic polymer binder comprises from about 2% to about 5% of said coating composition's total weight.

3. The method as recited in claim 2 wherein said polyvinyl acetate emulsion is a homopolymer polyvinyl acetate emulsion and a co-polymer polyvinyl acetate emulsion.

4. The method as recited in claim 3 wherein said homopolymer polyvinyl acetate emulsion comprises from about 13% to about 18% of said coating composition's total weight and said co-polymer polyvinyl acetate emulsion comprises from about 3% to about 6% of said coating composition's total weight.

5. The method as recited in claim 1 wherein said acrylic polymer binder further comprises a pigment and a buffering agent.

6. The method as recited in claim 5 wherein said mineral-based coating composition has a pH of from about 7.0 to about 7.5.

7. The method as recited in claim 5 wherein said pigment is selected from the group consisting of titanium dioxide, zirconium dioxide and hafnium dioxide.

8. The method as recited in claim 5 wherein said pigment is a titanium dioxide.

9. The method as recited in claim 1 wherein said mineral-based coating step is applied by a curtain coating process.

10. The method as recited in claim 1 further comprising the step of applying additional optional topical coatings over said mineral-based coating.

11. The method as recited in claim 1 wherein said backing material is hardboard.

12. The method as recited in claim 1 wherein said backing material is plastic.

13. The method as recited in claim 1 wherein said backing material is acrylic plastic.

14. The method as recited in claim 1 wherein said mineral extender is kaolin clay.

15. The method as recited in claim 14 wherein said kaolin clay is a delaminated hydrated aluminum silicate clay and has an aspect ratio of about 11 to about 1.

16. The method as recited in claim 1 wherein said backing material is flexible.

17. The method as recited in claim 1 wherein said mineral-based coating composition further comprises a non-foaming surfactant.

18. The method as recited in claim 1 wherein said mineral-based coating composition further comprises a defloculant.

19. The method as recited in claim 18 wherein said defloculant is sodium silicate.

20. The method as recited in claim 1 wherein said mineral-based coating composition further comprises water miscible perlite.

21. The method as recited in claim 1 further comprising the step of applying a perlite layer over said mineral based coating composition.

22. The method as recited in claim 1 further comprising the step of applying a layer of photosensitive material over said mineral based coating composition.

* * * * *